United States Patent
Lauk et al.

(10) Patent No.: US 11,479,912 B2
(45) Date of Patent: Oct. 25, 2022

(54) DISPERSE AZO DYES

(71) Applicant: Huntsman International LLC, Basel (CH)

(72) Inventors: Urs Lauk, Magstatt-le-Haut (FR); Patric Nowack, Steinen (DE); Romeo Dreier, Fehren (CH)

(73) Assignee: Huntsman Advanced Materials Licensing CH GmbH

( * ) Notice: Subject to any disclaimer, the term of this patent is extended or adjusted under 35 U.S.C. 154(b) by 0 days.

(21) Appl. No.: 16/620,698

(22) PCT Filed: May 15, 2018

(86) PCT No.: PCT/EP2018/062523
§ 371 (c)(1),
(2) Date: Dec. 9, 2019

(87) PCT Pub. No.: WO2019/001832
PCT Pub. Date: Jan. 3, 2019

(65) Prior Publication Data
US 2020/0199813 A1 Jun. 25, 2020

(30) Foreign Application Priority Data
Jun. 28, 2017 (EP) ..................... 17178280

(51) Int. Cl.
*D06P 3/54* (2006.01)
*C09B 29/08* (2006.01)
*D06P 1/18* (2006.01)

(52) U.S. Cl.
CPC ............ *D06P 3/54* (2013.01); *C09B 29/0813* (2013.01); *C09B 29/0815* (2013.01); *D06P 1/18* (2013.01)

(58) Field of Classification Search
CPC .......... D06P 5/34; D06P 1/18; C09B 29/0815; C09B 29/0813
See application file for complete search history.

(56) References Cited

U.S. PATENT DOCUMENTS

| 4,678,476 A | | 7/1987 | Tappe et al. | |
|---|---|---|---|---|
| 5,529,586 A | * | 6/1996 | Fukui | C09B 67/0041 8/639 |
| 5,688,288 A | * | 11/1997 | Akatani | C09B 29/0081 8/639 |
| 6,562,082 B1 | * | 5/2003 | Leaver | C09B 67/0051 8/532 |
| 7,097,699 B2 | * | 8/2006 | Egli | C09B 67/0073 106/31.43 |
| 2014/0041134 A1 | | 2/2014 | Scheibli et al. | |

FOREIGN PATENT DOCUMENTS

| CN | 1075142 C | | 11/2001 | |
|---|---|---|---|---|
| CN | 102732056 A | * | 10/2012 | ............. C09B 67/22 |
| FR | 2008404 A | | 1/1970 | |
| GB | 1275603 | * | 5/1972 | ............. C09B 29/08 |
| GB | 1275603 A | | 5/1972 | |
| TW | 201422726 A | | 6/2014 | |
| WO | 2009013122 A | | 1/2009 | |
| WO | 2014016072 A | | 1/2014 | |

OTHER PUBLICATIONS

International Search Report and Written Opinion received in corresponding PCT Application PCT/EP2018/062523 dated Jan. 3, 2019.

* cited by examiner

*Primary Examiner* — Amina S Khan
(74) *Attorney, Agent, or Firm* — Huntsman International LLC

(57) ABSTRACT

The present invention relates to disperse azo dyes of formula

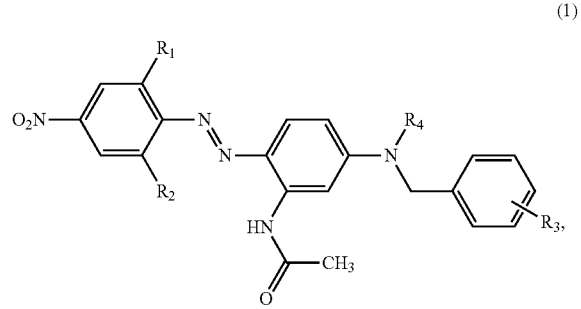

(1)

wherein
$R_1$ is bromo, nitro, cyano, methyl, methoxy or trifluoromethyl;
$R_2$ is hydrogen, chloro, bromo or trifluoromethyl;
$R_3$ is hydrogen, chloro, bromo, methoxy, trifluoromethyl, nitro or cyano; and
$R_4$ is methyl, ethyl, n-propyl, 2-methoxyethyl, methoxycarbonylmethyl or 2-methoxycarbonylethyl;
with the proviso that $R_1$ is cyano in case $R_2$ denotes chloro or bromo,
to a process for the preparation of such dyes and to their use in the dyeing or printing of semi-synthetic and, especially, synthetic hydrophobic fibre materials, more especially textile materials.

9 Claims, No Drawings

DISPERSE AZO DYES

CROSS-REFERENCE TO RELATED APPLICATIONS

This application is the National Phase of International Application PCT/EP2018/062523 filed May 15, 2018 which designated the U.S., and which claims priority to European Patent App. Serial No. 17178280.8 filed Jun. 28, 2017. The noted applications are incorporated herein by reference.

The present invention relates to disperse dyes having an acetylamino-substituted aniline coupling component, to a process for the preparation of such dyes and to their use in the dyeing or printing of semi-synthetic and, especially, synthetic hydrophobic fibre materials, more especially textile materials.

Disperse azo dyes derived from a nitroaniline diazo component and an acetylaminoaniline coupling component have been known for a long time, for example from FR 2008404, and are used in the dyeing of hydrophobic fibre materials. It has been found, however, that the dyeings or prints obtained using the dyes known at present do not in all cases meet current requirements, especially with regard to their fastness properties in respect of light, washing and perspiration. Particularly in the field of blue dyes there is a need for new dyes that give dyeings in brilliant shades having good fastness properties in respect of light, washing and perspiration.

It has now been found, surprisingly, that the dyes according to the invention meet the criteria mentioned above to a great extent.

The present invention accordingly relates to disperse dyes that yield dyeings having very good fastness to light, to washing and to perspiration and, in addition, exhibit good build-up both in the exhaust and thermosol processes and in textile printing.

The dyes according to the invention correspond to formula

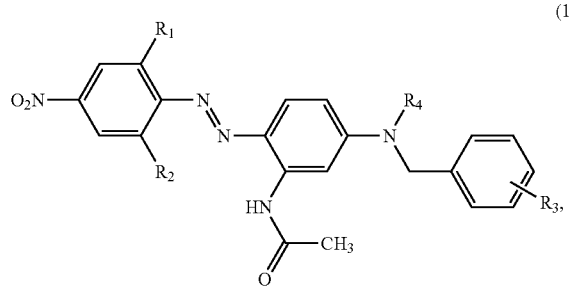

(1)

wherein $R_1$ is bromo, nitro, cyano, methyl, methoxy or trifluoromethyl;

$R_2$ is hydrogen, chloro, bromo or trifluoromethyl;

$R_3$ is hydrogen, chloro, bromo, methoxy, trifluoromethyl, nitro or cyano; and $R_4$ is methyl, ethyl, n-propyl, 2-methoxyethyl, methoxycarbonylmethyl or 2-methoxycarbonylethyl;

with the proviso that $R_1$ is cyano in case $R_2$ denotes chloro or bromo and $R_1$ is cyano or nitro in case $R_2$ denotes trifluoromethyl.

In formula (1) $R_1$ is preferably cyano.

Further preferred are dyes of formula (1) wherein $R_2$ is chloro.

Special preference is given to dyes of formula (1) wherein $R_3$ is hydrogen.

$R_4$ in formula (1) is preferably methyl, ethyl, methoxycarbonylmethyl or 2-methoxycarbonylethyl.

The invention also relates to a process for the preparation of a dye of formula (1) as defined above, which comprises diazotising a compound of formula

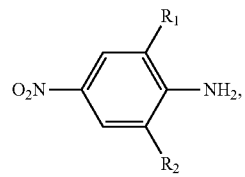

(2)

and coupling the diazonium compound so obtained to a coupling component of formula

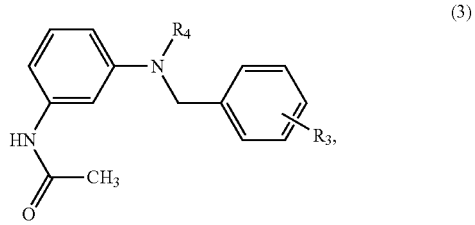

(3)

wherein $R_1$, $R_2$, $R_3$ and $R_4$ have the meanings given for formula (1) above.

The diazo components of formula (2) as well as the coupling components of formula (3) are known or can be prepared in a manner known per se. Some are commercially available.

The diazotisation is carried out in a manner known per se, for example with sodium nitrite in an acidic, e.g. hydrochloric-acid-containing or sulfuric-acid-containing, aqueous medium. The diazotisation may, however, also be carried out using other diazotisation agents, for example using nitrosylsulfuric acid. In the diazotisation, an additional acid may be present in the reaction medium, for example phosphoric acid, sulfuric acid, acetic acid, propionic acid or hydrochloric acid or a mixture of such acids, for example a mixture of propionic acid and acetic acid. The diazotisation is advantageously carried out at temperatures of from −10 to 30° C., for example from −10° C. to room temperature.

The coupling of the diazotised compound to the coupling component of formula (3) is likewise effected in known manner, for example in an acidic, aqueous or aqueous-organic medium, advantageously at temperatures of from −10 to 30° C., especially below 10° C. Examples of acids used are hydrochloric acid, acetic acid, propionic acid, sulfuric acid and phosphoric acid.

The present invention further relates to a dye mixture comprising at least one dye of formula (1) as defined above and at least one further dye selected from the group consisting of C.I. Disperse Blue 60, C.I. Disperse Blue 79:1, C.I. Disperse Blue 72:2, C.I. Disperse Blue 148, C.I. Disperse Blue 149, C.I. Disperse Blue 165, C.I. Disperse Blue 165:1, C.I. Disperse Blue 207, C.I. Disperse Blue 284, C.I. Disperse Blue 295, C.I. Disperse Blue 316, C.I. Disperse Blue 337, C.I. Disperse Blue 354, C.I. Disperse Blue 366, C.I. Disperse Blue 367, C.I. Disperse Blue 368, C.I. Disperse Blue 376, C.I. Disperse Blue 378, C.I. Disperse Blue 380, C.I. Disperse Green 9, C.I. Disperse Violet 107, the compounds of formulas (101)-(179) described in WO 2014/016072, the compounds of formulas (101)-(106) described in WO 2009/013122 and the compounds of formulas II-2, II-3, II-4 and III-1-III-8 described in CN 101955691.

The dye mixtures according to the invention can be prepared, for example, by simply mixing the individual dyes.

The amount of the individual dyes in the dye mixtures according to the invention can vary within a wide range.

The dye mixtures according to the invention advantageously contain at least 20% by weight, preferably at least 30% by weight and especially at least 40% by weight, of one or more dyes of formula (1).

The dyes and dye mixtures according to the invention can be used in the dyeing or printing of semi-synthetic and, especially, synthetic hydrophobic fibre materials, more especially textile materials. Textile materials composed of blends that contain such semi-synthetic and/or synthetic hydrophobic fibre materials can likewise be dyed or printed using the dyes or dye mixtures according to the invention.

Semi-synthetic fibre materials that come into consideration are especially cellulose 2% acetate and cellulose triacetate.

Synthetic hydrophobic fibre materials consist especially of linear, aromatic polyesters, for example those of terephthalic acid and glycols, especially ethylene glycol, or condensation products of terephthalic acid and 1,4-bis(hydroxymethyl)cyclohexane; of polycarbonates, for example those of α,α-dimethyl-4,4-dihydroxy-diphenylmethane and phosgene, and of fibres based on polyvinyl chloride and on polyamide.

The application of the dyes and dye mixtures according to the invention to the fibre materials is effected in accordance with known dyeing procedures. For example, polyester fibre materials are dyed in the exhaust process from an aqueous dispersion in the presence of customary anionic or non-ionic dispersants and optionally customary swelling agents (carriers) at temperatures of from 80 to 140° C. Cellulose 2½% acetate is dyed preferably at from 65 to 85° C. and cellulose triacetate at temperatures of from 65 to 115° C.

The dyes and dye mixtures according to the invention will not colour wool and cotton present at the same time in the dyebath or will colour such materials only slightly (very good reservation), so that they can also be used satisfactorily in the dyeing of polyester/wool and polyester/cellulosic fibre blend fabrics.

The dyes and dye mixtures according to the invention are suitable for dyeing in accordance with the thermosol process, in the exhaust process and for printing processes like screen printing or ink-jet printing.

The said fibre materials can be in a variety of processing forms, e.g. in the form of fibres, yarns or non-wovens, in the form of woven fabrics or knitted fabrics.

It is advantageous to convert the dyes and dye mixtures according to the invention into a dye preparation prior to use. For that purpose, the dye is ground so that its particle size is on average from 0.1 to 10 microns. The grinding can be carried out in the presence of dispersants. For example, the dried dye is ground with a dispersant or is kneaded in paste form with a dispersant and then dried in vacuo or by atomisation. The preparations so obtained can be used, after the addition of water, to prepare print pastes and dyebaths.

For printing, the customary thickeners will be used, e.g. modified or unmodified natural products, for example alginates, British gum, gum arabic, crystal gum, locust bean flour, tragacanth, carboxymethylcellulose, hydroxyethylcellulose, starch or synthetic products, for example polyacrylamides, polyacrylic acid or copolymers thereof, or polyvinyl alcohols.

The dyes and dye mixtures according to the invention impart to the mentioned materials, especially to polyester materials, level colour shades having very good in-use fastness properties, such as, especially, good fastness to light, to thermofixing, to pleating, to chlorine and to wetting, such as fastness to water, to perspiration and to washing; the finished dyeings are also distinguished by very good fastness to rubbing. Special mention should be made of the good fastness properties of the resulting dyeings in respect of light, perspiration and, especially, washing.

The dyes and dye mixtures according to the invention can also be used satisfactorily in the preparation of mixed shades together with other dyes.

The dyes and dye mixtures according to the invention are also very suitable for dyeing hydrophobic fibre materials from supercritical $CO_2$.

The present invention relates also to the above-mentioned use of the dyes and dye mixtures according to the invention as well as to a process for the dyeing or printing of semi-synthetic or synthetic hydrophobic fibre materials, especially textile materials, wherein a dye according to the invention is applied to the said materials or is incorporated into those materials. The said hydrophobic fibre materials are preferably textile polyester materials. Further substrates that can be treated by the process according to the invention as well as preferred process conditions can be found above in the detailed description of the use of the dyes according to the invention.

The invention relates also to hydrophobic fibre materials, especially polyester textile materials, dyed or printed by the said process.

The dyes according to the invention are also suitable for modern reproduction processes, for example thermotransfer printing.

The following Examples serve to illustrate the invention. In the Examples, unless otherwise indicated, parts are parts by weight and percentages are percent by weight. The temperatures are given in degrees Celsius. The relationship between parts by weight and parts by volume is the same as that between grams and cubic centimetres.

RT=room temperature

I. PREPARATION EXAMPLES

Example I.1

A. Diazotation 20 g of conc. sulfuric acid are placed in a laboratory reaction apparatus. After addition of 5 g ice the solution is cooled to RT. At this temperature, 6.01 g of 2-bromo-4-nitro-6-cyanoaniline are added. After being stirred for 30 min at RT and cooling down to 10° C., 8.2 g of 40% nitrosylsulfuric acid are added dropwise. The reaction mixture is stirred for a further 60 min at 10° C. Afterwards, the excess nitrite is destroyed by addition of sulfamic acid.

B. Coupling 7.83 g of finely powdered N-3-nitrobenzyl-N-ethyl-3-acetylaminoaniline prepared according to the method described in Example 1a of FR 2008404 are suspended in 10 ml ethanol and mixed with 20 g of ice.

Under stirring the solution of the diazonium salt obtained in step A is added dropwise within 60 min. The reaction mixture is stirred at RT over night. After filtration, washing and drying 11.75 g (83%) of the dye of formula (101) are obtained.

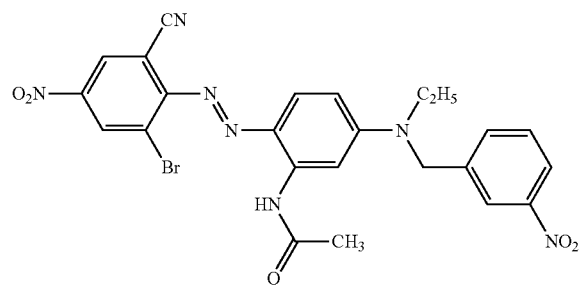

(101)

The dyes (102)-(1252) listed in Table 1 are prepared analogously to the process described in Example I.1.

TABLE 1

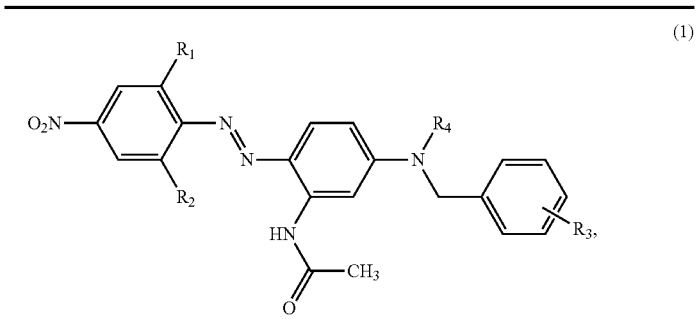

(1)

($\lambda_{max}$ = wavelength of the absorption maximum)

| Compound | $R_1$ | $R_2$ | $R_3$ | $R_4$ | $\lambda_{max}$/nm |
|---|---|---|---|---|---|
| 101 | CN | Br | m-NO$_2$ | —C$_2$H$_5$ | 573 |
| 102 | CN | Br | m-NO$_2$ | —CH$_3$ | |
| 103 | CN | Br | m-NO$_2$ | n-C$_3$H$_7$ | |
| 104 | CN | Br | m-NO$_2$ | —CH$_2$CH$_2$OCH$_3$ | |
| 105 | CN | Br | m-NO$_2$ | —CH$_2$CO—OCH$_3$ | |
| 106 | CN | Br | m-CF$_3$ | —CH$_2$CH$_2$CO—OCH$_3$ | |
| 107 | CN | Br | m-CF$_3$ | —CH$_3$ | |
| 108 | CN | Br | m-CF$_3$ | —C$_2$H$_5$ | |
| 109 | CN | Br | m-CF$_3$ | n-C$_3$H$_7$ | |
| 110 | CN | Br | m-CF$_3$ | —CH$_2$CH$_2$OCH$_3$ | |
| 111 | CN | Br | m-CF$_3$ | —CH$_2$CO—OCH$_3$ | |
| 112 | CN | Br | m-CF$_3$ | —CH$_2$CH$_2$CO—OCH$_3$ | |
| 113 | CN | Br | p-OCH$_3$ | —CH$_3$ | |
| 114 | CN | Br | p-OCH$_3$ | —C$_2$H$_5$ | |
| 115 | CN | Br | p-OCH$_3$ | n-C$_3$H$_7$ | |
| 116 | CN | Br | p-OCH$_3$ | —CH$_2$CH$_2$OCH$_3$ | |
| 117 | CN | Br | p-OCH$_3$ | —CH$_2$CO—OCH$_3$ | |
| 118 | CN | Br | p-OCH$_3$ | —CH$_2$CH$_2$CO—OCH$_3$ | |
| 119 | CN | Br | p-CN | —CH$_3$ | |
| 120 | CN | Br | p-CN | —C$_2$H$_5$ | |
| 121 | CN | Br | p-CN | n-C$_3$H$_7$ | |
| 122 | CN | Br | p-CN | —CH$_2$CH$_2$OCH$_3$ | |
| 123 | CN | Br | p-CN | —CH$_2$CO—OCH$_3$ | |
| 124 | CN | Br | p-CN | —CH$_2$CH$_2$CO—OCH$_3$ | |
| 125 | CN | Br | p-Cl | —CH$_3$ | |
| 126 | CN | Br | p-Cl | —C$_2$H$_5$ | |
| 127 | CN | Br | p-Cl | n-C$_3$H$_7$ | |
| 128 | CN | Br | p-Cl | —CH$_2$CH$_2$OCH$_3$ | |
| 129 | CN | Br | p-Cl | —CH$_2$CO—OCH$_3$ | |
| 130 | CN | Br | p-Cl | —CH$_2$CH$_2$CO—OCH$_3$ | |
| 131 | CN | Br | p-Br | —CH$_3$ | |
| 132 | CN | Br | p-Br | —C$_2$H$_5$ | |
| 133 | CN | Br | p-Br | n-C$_3$H$_7$ | |
| 134 | CN | Br | p-Br | —CH$_2$CH$_2$OCH$_3$ | |
| 135 | CN | Br | p-Br | —CH$_2$CO—OCH$_3$ | |
| 136 | CN | Br | p-Br | —CH$_2$CH$_2$CO—OCH$_3$ | |
| 137 | CN | Br | p-NO$_2$ | —CH$_3$ | |
| 138 | CN | Br | p-NO$_2$ | —C$_2$H$_5$ | |
| 139 | CN | Br | p-NO$_2$ | n-C$_3$H$_7$ | |
| 140 | CN | Br | p-NO$_2$ | —CH$_2$CH$_2$OCH$_3$ | |
| 141 | CN | Br | p-NO$_2$ | —CH$_2$CO—OCH$_3$ | |
| 142 | CN | Br | p-NO$_2$ | —CH$_2$CH$_2$CO—OCH$_3$ | |
| 143 | CN | Br | H | —CH$_3$ | 578 |
| 144 | CN | Br | H | —C$_2$H$_5$ | 582 |
| 145 | CN | Br | H | n-C$_3$H$_7$ | 587 |
| 146 | CN | Br | H | —CH$_2$CH$_2$OCH$_3$ | 572 |
| 147 | CN | Br | H | —CH$_2$CO—OCH$_3$ | 555 |
| 148 | CN | Br | H | —CH$_2$CH$_2$CO—OCH$_3$ | 571 |
| 149 | CN | Cl | m-NO$_2$ | —CH$_3$ | |
| 150 | CN | Cl | m-NO$_2$ | —C$_2$H$_5$ | |
| 151 | CN | Cl | m-NO$_2$ | n-C$_3$H$_7$ | |
| 152 | CN | Cl | m-NO$_2$ | —CH$_2$CH$_2$OCH$_3$ | |
| 153 | CN | Cl | m-NO$_2$ | —CH$_2$CO—OCH$_3$ | |
| 154 | CN | Cl | m-CF$_3$ | —CH$_2$CH$_2$CO—OCH$_3$ | |
| 155 | CN | Cl | m-CF$_3$ | —CH$_3$ | |
| 156 | CN | Cl | m-CF$_3$ | —C$_2$H$_5$ | |
| 157 | CN | Cl | m-CF$_3$ | n-C$_3$H$_7$ | |

TABLE 1-continued

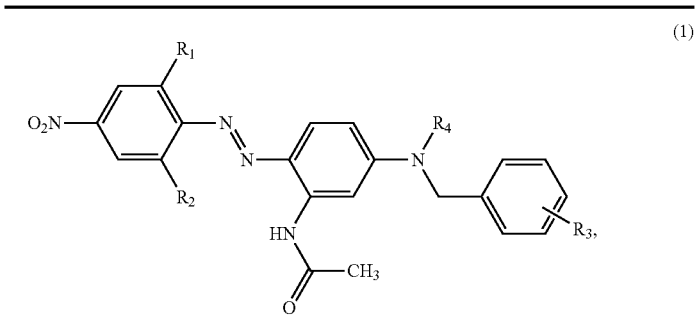

(1)

($\lambda_{max}$ = wavelength of the absorption maximum)

| Compound | $R_1$ | $R_2$ | $R_3$ | $R_4$ | $\lambda_{max}$/nm |
|---|---|---|---|---|---|
| 158 | CN | Cl | m-CF$_3$ | —CH$_2$CH$_2$OCH$_3$ | |
| 159 | CN | Cl | m-CF$_3$ | —CH$_2$CO—OCH$_3$ | |
| 160 | CN | Cl | m-CF$_3$ | —CH$_2$CH$_2$CO—OCH$_3$ | |
| 161 | CN | Cl | p-OCH$_3$ | —CH$_3$ | |
| 162 | CN | Cl | p-OCH$_3$ | —C$_2$H$_5$ | |
| 163 | CN | Cl | p-OCH$_3$ | n-C$_3$H$_7$ | |
| 164 | CN | Cl | p-OCH$_3$ | —CH$_2$CH$_2$OCH$_3$ | |
| 165 | CN | Cl | p-OCH$_3$ | —CH$_2$CO—OCH$_3$ | |
| 166 | CN | Cl | p-OCH$_3$ | —CH$_2$CH$_2$CO—OCH$_3$ | |
| 167 | CN | Cl | p-CN | —CH$_3$ | |
| 168 | CN | Cl | p-CN | —C$_2$H$_5$ | |
| 169 | CN | Cl | p-CN | n-C$_3$H$_7$ | |
| 170 | CN | Cl | p-CN | —CH$_2$CH$_2$OCH$_3$ | |
| 171 | CN | Cl | p-CN | —CH$_2$CO—OCH$_3$ | |
| 172 | CN | Cl | p-CN | —CH$_2$CH$_2$CO—OCH$_3$ | |
| 173 | CN | Cl | p-Cl | —CH$_3$ | |
| 174 | CN | Cl | p-Cl | —C$_2$H$_5$ | |
| 175 | CN | Cl | p-Cl | n-C$_3$H$_7$ | |
| 176 | CN | Cl | p-Cl | —CH$_2$CH$_2$OCH$_3$ | |
| 177 | CN | Cl | p-Cl | —CH$_2$CO—OCH$_3$ | |
| 178 | CN | Cl | p-Cl | —CH$_2$CH$_2$CO—OCH$_3$ | |
| 179 | CN | Cl | p-Br | —CH$_3$ | |
| 180 | CN | Cl | p-Br | —C$_2$H$_5$ | |
| 181 | CN | Cl | p-Br | n-C$_3$H$_7$ | |
| 182 | CN | Cl | p-Br | —CH$_2$CH$_2$OCH$_3$ | |
| 183 | CN | Cl | p-Br | —CH$_2$CO—OCH$_3$ | |
| 184 | CN | Cl | p-Br | —CH$_2$CH$_2$CO—OCH$_3$ | |
| 185 | CN | Cl | p-NO$_2$ | —CH$_3$ | |
| 186 | CN | Cl | p-NO$_2$ | —C$_2$H$_5$ | |
| 187 | CN | Cl | p-NO$_2$ | n-C$_3$H$_7$ | |
| 188 | CN | Cl | p-NO$_2$ | —CH$_2$CH$_2$OCH$_3$ | |
| 189 | CN | Cl | p-NO$_2$ | —CH$_2$CO—OCH$_3$ | 550 |
| 190 | CN | Cl | p-NO$_2$ | —CH$_2$CH$_2$CO—OCH$_3$ | 565 |
| 191 | CN | Cl | H | —CH$_3$ | 578 |
| 192 | CN | Cl | H | —C$_2$H$_5$ | 585 |
| 193 | CN | Cl | H | n-C$_3$H$_7$ | 590 |
| 194 | CN | Cl | H | —CH$_2$CH$_2$OCH$_3$ | 577 |
| 195 | CN | Cl | H | —CH$_2$CO—OCH$_3$ | 560 |
| 196 | CN | Cl | H | —CH$_2$CH$_2$CO—OCH$_3$ | 570 |
| 197 | CN | CF$_3$ | m-NO$_2$ | —CH$_3$ | |
| 198 | CN | CF$_3$ | m-NO$_2$ | —C$_2$H$_5$ | |
| 199 | CN | CF$_3$ | m-NO$_2$ | n-C$_3$H$_7$ | |
| 200 | CN | CF$_3$ | m-NO$_2$ | —CH$_2$CH$_2$OCH$_3$ | |
| 201 | CN | CF$_3$ | m-NO$_2$ | —CH$_2$CO—OCH$_3$ | |
| 202 | CN | CF$_3$ | m-CF$_3$ | —CH$_2$CH$_2$CO—OCH$_3$ | |
| 203 | CN | CF$_3$ | m-CF$_3$ | —CH$_3$ | |
| 204 | CN | CF$_3$ | m-CF$_3$ | —C$_2$H$_5$ | |
| 205 | CN | CF$_3$ | m-CF$_3$ | n-C$_3$H$_7$ | |
| 206 | CN | CF$_3$ | m-CF$_3$ | —CH$_2$CH$_2$OCH$_3$ | |
| 207 | CN | CF$_3$ | m-CF$_3$ | —CH$_2$CO—OCH$_3$ | |
| 208 | CN | CF$_3$ | m-CF$_3$ | —CH$_2$CH$_2$CO—OCH$_3$ | |
| 209 | CN | CF$_3$ | p-OCH$_3$ | —CH$_3$ | |
| 210 | CN | CF$_3$ | p-OCH$_3$ | —C$_2$H$_5$ | |
| 211 | CN | CF$_3$ | p-OCH$_3$ | n-C$_3$H$_7$ | |
| 212 | CN | CF$_3$ | p-OCH$_3$ | —CH$_2$CH$_2$OCH$_3$ | |
| 213 | CN | CF$_3$ | p-OCH$_3$ | —CH$_2$CO—OCH$_3$ | |
| 214 | CN | CF$_3$ | p-OCH$_3$ | —CH$_2$CH$_2$CO—OCH$_3$ | |
| 215 | CN | CF$_3$ | p-CN | —CH$_3$ | |
| 216 | CN | CF$_3$ | p-CN | —C$_2$H$_5$ | |
| 217 | CN | CF$_3$ | p-CN | n-C$_3$H$_7$ | |
| 218 | CN | CF$_3$ | p-CN | —CH$_2$CH$_2$OCH$_3$ | |

TABLE 1-continued

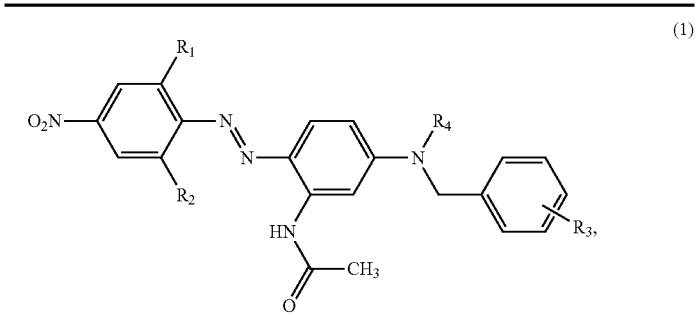

($\lambda_{max}$ = wavelength of the absorption maximum)

| Compound | $R_1$ | $R_2$ | $R_3$ | $R_4$ | $\lambda_{max}$/nm |
|---|---|---|---|---|---|
| 219 | CN | $CF_3$ | p-CN | —$CH_2CO$—$OCH_3$ | |
| 220 | CN | $CF_3$ | p-CN | —$CH_2CH_2CO$—$OCH_3$ | |
| 221 | CN | $CF_3$ | p-Cl | —$CH_3$ | |
| 222 | CN | $CF_3$ | p-Cl | —$C_2H_5$ | |
| 223 | CN | $CF_3$ | p-Cl | n-$C_3H_7$ | |
| 224 | CN | $CF_3$ | p-Cl | —$CH_2CH_2OCH_3$ | |
| 225 | CN | $CF_3$ | p-Cl | —$CH_2CO$—$OCH_3$ | |
| 226 | CN | $CF_3$ | p-Cl | —$CH_2CH_2CO$—$OCH_3$ | |
| 227 | CN | $CF_3$ | p-Br | —$CH_3$ | |
| 228 | CN | $CF_3$ | p-Br | —$C_2H_5$ | |
| 229 | CN | $CF_3$ | p-Br | n-$C_3H_7$ | |
| 230 | CN | $CF_3$ | p-Br | —$CH_2CH_2OCH_3$ | |
| 231 | CN | $CF_3$ | p-Br | —$CH_2CO$—$OCH_3$ | |
| 232 | CN | $CF_3$ | p-Br | —$CH_2CH_2CO$—$OCH_3$ | |
| 233 | CN | $CF_3$ | p-$NO_2$ | —$CH_3$ | |
| 234 | CN | $CF_3$ | p-$NO_2$ | —$C_2H_5$ | |
| 235 | CN | $CF_3$ | p-$NO_2$ | n-$C_3H_7$ | |
| 236 | CN | $CF_3$ | p-$NO_2$ | —$CH_2CH_2OCH_3$ | |
| 237 | CN | $CF_3$ | p-$NO_2$ | —$CH_2CO$—$OCH_3$ | |
| 238 | CN | $CF_3$ | p-$NO_2$ | —$CH_2CH_2CO$—$OCH_3$ | |
| 239 | CN | $CF_3$ | H | —$CH_3$ | |
| 240 | CN | $CF_3$ | H | —$C_2H_5$ | |
| 241 | CN | $CF_3$ | H | n-$C_3H_7$ | |
| 242 | CN | $CF_3$ | H | —$CH_2CH_2OCH_3$ | |
| 242 | CN | $CF_3$ | H | —$CH_2CO$—$OCH_3$ | |
| 244 | CN | $CF_3$ | H | —$CH_2CH_2CO$—$OCH_3$ | |
| 245 | CN | H | m-$NO_2$ | —$CH_3$ | |
| 246 | CN | H | m-$NO_2$ | —$C_2H_5$ | |
| 247 | CN | H | m-$NO_2$ | n-$C_3H_7$ | |
| 248 | CN | H | m-$NO_2$ | —$CH_2CH_2OCH_3$ | |
| 249 | CN | H | m-$NO_2$ | —$CH_2CO$—$OCH_3$ | |
| 250 | CN | H | m-$CF_3$ | —$CH_2CH_2CO$—$OCH_3$ | |
| 251 | CN | H | m-$CF_3$ | —$CH_3$ | |
| 252 | CN | H | m-$CF_3$ | —$C_2H_5$ | |
| 253 | CN | H | m-$CF_3$ | n-$C_3H_7$ | |
| 254 | CN | H | m-$CF_3$ | —$CH_2CH_2OCH_3$ | |
| 255 | CN | H | m-$CF_3$ | —$CH_2CO$—$OCH_3$ | |
| 256 | CN | H | m-$CF_3$ | —$CH_2CH_2CO$—$OCH_3$ | |
| 257 | CN | H | p-$OCH_3$ | —$CH_3$ | |
| 258 | CN | H | p-$OCH_3$ | —$C_2H_5$ | |
| 259 | CN | H | p-$OCH_3$ | n-$C_3H_7$ | |
| 260 | CN | H | p-$OCH_3$ | —$CH_2CH_2OCH_3$ | |
| 261 | CN | H | p-$OCH_3$ | —$CH_2CO$—$OCH_3$ | |
| 262 | CN | H | p-$OCH_3$ | —$CH_2CH_2CO$—$OCH_3$ | |
| 263 | CN | H | p-CN | —$CH_3$ | |
| 264 | CN | H | p-CN | —$C_2H_5$ | |
| 265 | CN | H | p-CN | n-$C_3H_7$ | |
| 266 | CN | H | p-CN | —$CH_2CH_2OCH_3$ | |
| 267 | CN | H | p-CN | —$CH_2CO$—$OCH_3$ | |
| 268 | CN | H | p-CN | —$CH_2CH_2CO$—$OCH_3$ | |
| 269 | CN | H | p-Cl | —$CH_3$ | |
| 270 | CN | H | p-Cl | —$C_2H_5$ | |
| 271 | CN | H | p-Cl | n-$C_3H_7$ | |
| 272 | CN | H | p-Cl | —$CH_2CH_2OCH_3$ | |
| 273 | CN | H | p-Cl | —$CH_2CO$—$OCH_3$ | |
| 274 | CN | H | p-Cl | —$CH_2CH_2CO$—$OCH_3$ | |
| 275 | CN | H | p-Br | —$CH_3$ | |
| 276 | CN | H | p-Br | —$C_2H_5$ | |
| 277 | CN | H | p-Br | n-$C_3H_7$ | |
| 278 | CN | H | p-Br | —$CH_2CH_2OCH_3$ | |
| 279 | CN | H | p-Br | —$CH_2CO$—$OCH_3$ | |

TABLE 1-continued

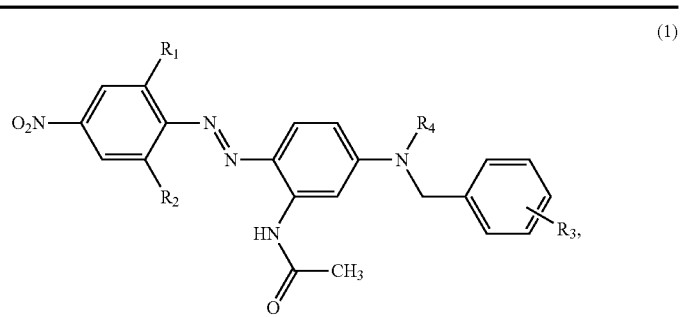

(1)

($\lambda_{max}$ = wavelength of the absorption maximum)

| Compound | $R_1$ | $R_2$ | $R_3$ | $R_4$ | $\lambda_{max}$/nm |
|---|---|---|---|---|---|
| 280 | CN | H | p-Br | —CH$_2$CH$_2$CO—OCH$_3$ | |
| 281 | CN | H | p-NO$_2$ | —CH$_3$ | |
| 282 | CN | H | p-NO$_2$ | —C$_2$H$_5$ | |
| 283 | CN | H | p-NO$_2$ | n-C$_3$H$_7$ | |
| 284 | CN | H | p-NO$_2$ | —CH$_2$CH$_2$OCH$_3$ | |
| 285 | CN | H | p-NO$_2$ | —CH$_2$CO—OCH$_3$ | |
| 286 | CN | H | p-NO$_2$ | —CH$_2$CH$_2$CO—OCH$_3$ | |
| 287 | CN | H | H | —CH$_3$ | |
| 288 | CN | H | H | —C$_2$H$_5$ | 545 |
| 289 | CN | H | H | n-C$_3$H$_7$ | |
| 290 | CN | H | H | —CH$_2$CH$_2$OCH$_3$ | |
| 291 | CN | H | H | —CH$_2$CO—OCH$_3$ | |
| 292 | CN | H | H | —CH$_2$CH$_2$CO—OCH$_3$ | |
| 293 | NO$_2$ | CF$_3$ | m-NO$_2$ | —CH$_3$ | |
| 294 | NO$_2$ | CF$_3$ | m-NO$_2$ | —C$_2$H$_5$ | |
| 295 | NO$_2$ | CF$_3$ | m-NO$_2$ | n-C$_3$H$_7$ | |
| 296 | NO$_2$ | CF$_3$ | m-NO$_2$ | —CH$_2$CH$_2$OCH$_3$ | |
| 297 | NO$_2$ | CF$_3$ | m-NO$_2$ | —CH$_2$CO—OCH$_3$ | |
| 298 | NO$_2$ | CF$_3$ | m-CF$_3$ | —CH$_2$CH$_2$CO—OCH$_3$ | |
| 299 | NO$_2$ | CF$_3$ | m-CF$_3$ | —CH$_3$ | |
| 300 | NO$_2$ | CF$_3$ | m-CF$_3$ | —C$_2$H$_5$ | |
| 301 | NO$_2$ | CF$_3$ | m-CF$_3$ | n-C$_3$H$_7$ | |
| 302 | NO$_2$ | CF$_3$ | m-CF$_3$ | —CH$_2$CH$_2$OCH$_3$ | |
| 303 | NO$_2$ | CF$_3$ | m-CF$_3$ | —CH$_2$CO—OCH$_3$ | |
| 304 | NO$_2$ | CF$_3$ | m-CF$_3$ | —CH$_2$CH$_2$CO—OCH$_3$ | |
| 305 | NO$_2$ | CF$_3$ | p-OCH$_3$ | —CH$_3$ | |
| 306 | NO$_2$ | CF$_3$ | p-OCH$_3$ | —C$_2$H$_5$ | |
| 307 | NO$_2$ | CF$_3$ | p-OCH$_3$ | n-C$_3$H$_7$ | |
| 308 | NO$_2$ | CF$_3$ | p-OCH$_3$ | —CH$_2$CH$_2$OCH$_3$ | |
| 309 | NO$_2$ | CF$_3$ | p-OCH$_3$ | —CH$_2$CO—OCH$_3$ | |
| 310 | NO$_2$ | CF$_3$ | p-OCH$_3$ | —CH$_2$CH$_2$CO—OCH$_3$ | |
| 311 | NO$_2$ | CF$_3$ | p-CN | —CH$_3$ | |
| 312 | NO$_2$ | CF$_3$ | p-CN | —C$_2$H$_5$ | |
| 313 | NO$_2$ | CF$_3$ | p-CN | n-C$_3$H$_7$ | |
| 314 | NO$_2$ | CF$_3$ | p-CN | —CH$_2$CH$_2$OCH$_3$ | |
| 315 | NO$_2$ | CF$_3$ | p-CN | —CH$_2$CO—OCH$_3$ | |
| 316 | NO$_2$ | CF$_3$ | p-CN | —CH$_2$CH$_2$CO—OCH$_3$ | |
| 317 | NO$_2$ | CF$_3$ | p-Cl | —CH$_3$ | |
| 318 | NO$_2$ | CF$_3$ | p-Cl | —C$_2$H$_5$ | |
| 319 | NO$_2$ | CF$_3$ | p-Cl | n-C$_3$H$_7$ | |
| 320 | NO$_2$ | CF$_3$ | p-Cl | —CH$_2$CH$_2$OCH$_3$ | |
| 321 | NO$_2$ | CF$_3$ | p-Cl | —CH$_2$CO—OCH$_3$ | |
| 322 | NO$_2$ | CF$_3$ | p-Cl | —CH$_2$CH$_2$CO—OCH$_3$ | |
| 323 | NO$_2$ | CF$_3$ | p-Br | —CH$_3$ | |
| 324 | NO$_2$ | CF$_3$ | p-Br | —C$_2$H$_5$ | |
| 325 | NO$_2$ | CF$_3$ | p-Br | n-C$_3$H$_7$ | |
| 326 | NO$_2$ | CF$_3$ | p-Br | —CH$_2$CH$_2$OCH$_3$ | |
| 327 | NO$_2$ | CF$_3$ | p-Br | —CH$_2$CO—OCH$_3$ | |
| 328 | NO$_2$ | CF$_3$ | p-Br | —CH$_2$CH$_2$CO—OCH$_3$ | |
| 329 | NO$_2$ | CF$_3$ | p-NO$_2$ | —CH$_3$ | |
| 330 | NO$_2$ | CF$_3$ | p-NO$_2$ | —C$_2$H$_5$ | |
| 331 | NO$_2$ | CF$_3$ | p-NO$_2$ | n-C$_3$H$_7$ | |
| 332 | NO$_2$ | CF$_3$ | p-NO$_2$ | —CH$_2$CH$_2$OCH$_3$ | |
| 333 | NO$_2$ | CF$_3$ | p-NO$_2$ | —CH$_2$CO—OCH$_3$ | |
| 334 | NO$_2$ | CF$_3$ | p-NO$_2$ | —CH$_2$CH$_2$CO—OCH$_3$ | |
| 335 | NO$_2$ | CF$_3$ | H | —CH$_3$ | |
| 336 | NO$_2$ | CF$_3$ | H | —C$_2$H$_5$ | |
| 337 | NO$_2$ | CF$_3$ | H | n-C$_3$H$_7$ | |
| 338 | NO$_2$ | CF$_3$ | H | —CH$_2$CH$_2$OCH$_3$ | |
| 339 | NO$_2$ | CF$_3$ | H | —CH$_2$CO—OCH$_3$ | |
| 340 | NO$_2$ | CF$_3$ | H | —CH$_2$CH$_2$CO—OCH$_3$ | |

TABLE 1-continued

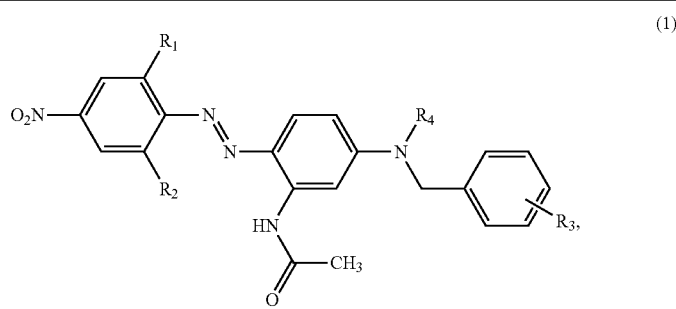

($\lambda_{max}$ = wavelength of the absorption maximum)

| Compound | $R_1$ | $R_2$ | $R_3$ | $R_4$ | $\lambda_{max}$/nm |
|---|---|---|---|---|---|
| 341 | $NO_2$ | H | m-$NO_2$ | —$CH_3$ | |
| 342 | $NO_2$ | H | m-$NO_2$ | —$C_2H_5$ | |
| 343 | $NO_2$ | H | m-$NO_2$ | n-$C_3H_7$ | |
| 344 | $NO_2$ | H | m-$NO_2$ | —$CH_2CH_2OCH_3$ | |
| 345 | $NO_2$ | H | m-$NO_2$ | —$CH_2CO$—$OCH_3$ | |
| 346 | $NO_2$ | H | m-$CF_3$ | —$CH_2CH_2CO$—$OCH_3$ | |
| 347 | $NO_2$ | H | m-$CF_3$ | —$CH_3$ | |
| 348 | $NO_2$ | H | m-$CF_3$ | —$C_2H_5$ | |
| 349 | $NO_2$ | H | m-$CF_3$ | n-$C_3H_7$ | |
| 350 | $NO_2$ | H | m-$CF_3$ | —$CH_2CH_2OCH_3$ | |
| 351 | $NO_2$ | H | m-$CF_3$ | —$CH_2CO$—$OCH_3$ | |
| 352 | $NO_2$ | H | m-$CF_3$ | —$CH_2CH_2CO$—$OCH_3$ | |
| 353 | $NO_2$ | H | p-$OCH_3$ | —$CH_3$ | |
| 354 | $NO_2$ | H | p-$OCH_3$ | —$C_2H_5$ | |
| 355 | $NO_2$ | H | p-$OCH_3$ | n-$C_3H_7$ | |
| 356 | $NO_2$ | H | p-$OCH_3$ | —$CH_2CH_2COH_3$ | |
| 357 | $NO_2$ | H | p-$OCH_3$ | —$CH_2CO$—$OCH_3$ | |
| 358 | $NO_2$ | H | p-$OCH_3$ | —$CH_2CH_2CO$—$OCH_3$ | |
| 359 | $NO_2$ | H | p-CN | —$CH_3$ | |
| 360 | $NO_2$ | H | p-CN | —$C_2H_5$ | |
| 361 | $NO_2$ | H | p-CN | n-$C_3H_7$ | |
| 362 | $NO_2$ | H | p-CN | —$CH_2CH_2COH_3$ | |
| 363 | $NO_2$ | H | p-CN | —$CH_2CO$—$OCH_3$ | |
| 364 | $NO_2$ | H | p-CN | —$CH_2CH_2CO$—$OCH_3$ | |
| 365 | $NO_2$ | H | p-Cl | —$CH_3$ | |
| 366 | $NO_2$ | H | p-Cl | —$C_2H_5$ | |
| 367 | $NO_2$ | H | p-Cl | n-$C_3H_7$ | |
| 368 | $NO_2$ | H | p-Cl | —$CH_2CH_2OCH_3$ | |
| 369 | $NO_2$ | H | p-Cl | —$CH_2CO$—$OCH_3$ | |
| 370 | $NO_2$ | H | p-Cl | —$CH_2CH_2CO$—$OCH_3$ | |
| 371 | $NO_2$ | H | p-Br | —$CH_3$ | |
| 372 | $NO_2$ | H | p-Br | —$C_2H_5$ | |
| 373 | $NO_2$ | H | p-Br | n-$C_3H_7$ | |
| 874 | $NO_2$ | H | p-Br | —$CH_2CH_2OCH_3$ | |
| 375 | $NO_2$ | H | p-Br | —$CH_2CO$—$OCH_3$ | |
| 376 | $NO_2$ | H | p-Br | —$CH_2CH_2CO$—$OCH_3$ | |
| 377 | $NO_2$ | H | p-$NO_2$ | —$CH_3$ | |
| 378 | $NO_2$ | H | p-$NO_2$ | —$C_2H_5$ | |
| 379 | $NO_2$ | H | p-$NO_2$ | n-$C_3H_7$ | |
| 380 | $NO_2$ | H | p-$NO_2$ | —$CH_2CH_2OCH_3$ | |
| 381 | $NO_2$ | H | p-$NO_2$ | —$CH_2CO$—$OCH_3$ | |
| 382 | $NO_2$ | H | p-$NO_2$ | —$CH_2CH_2CO$—$OCH_3$ | |
| 383 | $NO_2$ | H | H | —$CH_3$ | |
| 384 | $NO_2$ | H | H | —$C_2H_5$ | 540 |
| 385 | $NO_2$ | H | H | n-$C_3H_7$ | |
| 386 | $NO_2$ | H | H | —$CH_2CH_2OCH_3$ | |
| 387 | $NO_2$ | H | H | —$CH_2CO$—$OCH_3$ | |
| 388 | $NO_2$ | H | H | —$CH_2CH_2CO$—$OCH_3$ | |
| 389 | $CH_3$ | H | m-$NO_2$ | —$CH_3$ | |
| 390 | $CH_3$ | H | m-$NO_2$ | —$C_2H_5$ | |
| 391 | $CH_3$ | H | m-$NO_2$ | n-$C_3H_7$ | |
| 392 | $CH_3$ | H | m-$NO_2$ | —$CH_2CH_2OCH_3$ | |
| 393 | $CH_3$ | H | m-$NO_2$ | —$CH_2CO$—$OCH_3$ | |
| 394 | $CH_3$ | H | m-$CF_3$ | —$CH_2CH_2CO$—$OCH_3$ | |
| 395 | $CH_3$ | H | m-$CF_3$ | —$CH_3$ | |
| 396 | $CH_3$ | H | m-$CF_3$ | —$C_2H_5$ | |
| 397 | $CH_3$ | H | m-$CF_3$ | n-$C_3H_7$ | |
| 398 | $CH_3$ | H | m-$CF_3$ | —$CH_2CH_2OCH_3$ | |
| 399 | $CH_3$ | H | m-$CF_3$ | —$CH_2CO$—$OCH_3$ | |
| 400 | $CH_3$ | H | m-$CF_3$ | —$CH_2CH_2CO$—$OCH_3$ | |
| 401 | $CH_3$ | H | p-$OCH_3$ | —$CH_3$ | |

TABLE 1-continued

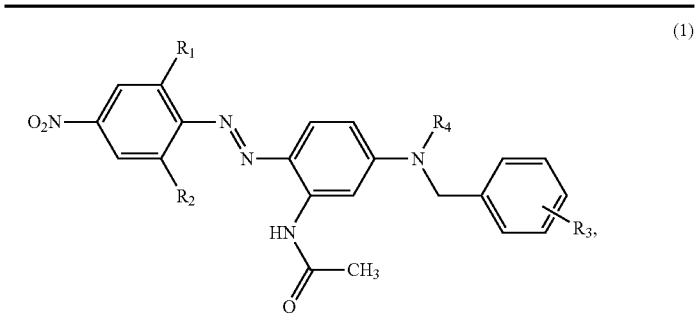

($\lambda_{max}$ = wavelength of the absorption maximum)

| Compound | $R_1$ | $R_2$ | $R_3$ | $R_4$ | $\lambda_{max}$/nm |
|---|---|---|---|---|---|
| 402 | CH$_3$ | H | p-OCH$_3$ | —C$_2$H$_5$ | |
| 403 | CH$_3$ | H | p-OCH$_3$ | n-C$_3$H$_7$ | |
| 404 | CH$_3$ | H | p-OCH$_3$ | —CH$_2$CH$_2$OCH$_3$ | |
| 405 | CH$_3$ | H | p-OCH$_3$ | —CH$_2$CO—OCH$_3$ | |
| 406 | CH$_3$ | H | p-OCH$_3$ | —CH$_2$CH$_2$CO—OCH$_3$ | |
| 407 | CH$_3$ | H | p-CN | —CH$_3$ | |
| 408 | CH$_3$ | H | p-CN | —C$_2$H$_5$ | |
| 409 | CH$_3$ | H | p-CN | n-C$_3$H$_7$ | |
| 410 | CH$_3$ | H | p-CN | —CH$_2$CH$_2$OCH$_3$ | |
| 411 | CH$_3$ | H | p-CN | —CH$_2$CO—OCH$_3$ | |
| 412 | CH$_3$ | H | p-CN | —CH$_2$CH$_2$CO—OCH$_3$ | |
| 413 | CH$_3$ | H | p-Cl | —CH$_3$ | |
| 414 | CH$_3$ | H | p-Cl | —C$_2$H$_5$ | |
| 415 | CH$_3$ | H | p-Cl | n-C$_3$H$_7$ | |
| 416 | CH$_3$ | H | p-Cl | —CH$_2$CH$_2$OCH$_3$ | |
| 417 | CH$_3$ | H | p-Cl | —CH$_2$CO—OCH$_3$ | |
| 418 | CH$_3$ | H | p-Cl | —CH$_2$CH$_2$CO—OCH$_3$ | |
| 419 | CH$_3$ | H | p-Br | —CH$_3$ | |
| 420 | CH$_3$ | H | p-Br | —C$_2$H$_5$ | |
| 421 | CH$_3$ | H | p-Br | n-C$_3$H$_7$ | |
| 422 | CH$_3$ | H | p-Br | —CH$_2$CH$_2$COH$_3$ | |
| 423 | CH$_3$ | H | p-Br | —CH$_2$CO—OCH$_3$ | |
| 424 | CH$_3$ | H | p-Br | —CH$_2$CH$_2$CO—OCH$_3$ | |
| 425 | CH$_3$ | H | p-NO$_2$ | —CH$_3$ | |
| 426 | CH$_3$ | H | p-NO$_2$ | —C$_2$H$_5$ | |
| 427 | CH$_3$ | H | p-NO$_2$ | n-C$_3$H$_7$ | |
| 428 | CH$_3$ | H | p-NO$_2$ | —CH$_2$CH$_2$OCH$_3$ | |
| 429 | CH$_3$ | H | p-NO$_2$ | —CH$_2$CO—OCH$_3$ | |
| 430 | CH$_3$ | H | p-NO$_2$ | —CH$_2$CH$_2$CO—OCH$_3$ | |
| 430 | CH$_3$ | H | H | —CH$_3$ | |
| 432 | CH$_3$ | H | H | —C$_2$H$_5$ | |
| 433 | CH$_3$ | H | H | n-C$_3$H$_7$ | |
| 434 | CH$_3$ | H | H | —CH$_2$CH$_2$OCH$_3$ | |
| 435 | CH$_3$ | H | H | —CH$_2$CO—OCH$_3$ | |
| 436 | CH$_3$ | H | H | —CH$_2$CH$_2$CO—OCH$_3$ | |
| 437 | OCH$_3$ | H | m-NO$_2$ | —CH$_3$ | |
| 438 | OCH$_3$ | H | m-NO$_2$ | —C$_2$H$_5$ | |
| 439 | OCH$_3$ | H | m-NO$_2$ | n-C$_3$H$_7$ | |
| 440 | OCH$_3$ | H | m-NO$_2$ | —CH$_2$CH$_2$OCH$_3$ | |
| 441 | OCH$_3$ | H | m-NO$_2$ | —CH$_2$CO—OCH$_3$ | |
| 442 | OCH$_3$ | H | m-CF$_3$ | —CH$_2$CH$_2$CO—OCH$_3$ | |
| 443 | OCH$_3$ | H | m-CF$_3$ | —CH$_3$ | |
| 444 | OCH$_3$ | H | m-CF$_3$ | —C$_2$H$_5$ | |
| 445 | OCH$_3$ | H | m-CF$_3$ | n-C$_3$H$_7$ | |
| 446 | OCH$_3$ | H | m-CF$_3$ | —CH$_2$CH$_2$OCH$_3$ | |
| 447 | OCH$_3$ | H | m-CF$_3$ | —CH$_2$CO—OCH$_3$ | |
| 448 | OCH$_3$ | H | m-CF$_3$ | —CH$_2$CH$_2$CO—OCH$_3$ | |
| 449 | OCH$_3$ | H | p-OCH$_3$ | —CH$_3$ | |
| 450 | OCH$_3$ | H | p-OCH$_3$ | —C$_2$H$_5$ | |
| 451 | OCH$_3$ | H | p-OCH$_3$ | n-C$_3$H$_7$ | |
| 452 | OCH$_3$ | H | p-OCH$_3$ | —CH$_2$CH$_2$OCH$_3$ | |
| 453 | OCH$_3$ | H | p-OCH$_3$ | —CH$_2$CO—OCH$_3$ | |
| 454 | OCH$_3$ | H | p-OCH$_3$ | —CH$_2$CH$_2$CO—OCH$_3$ | |
| 455 | OCH$_3$ | H | p-CN | —CH$_3$ | |
| 456 | OCH$_3$ | H | p-CN | —C$_2$H$_5$ | |
| 457 | OCH$_3$ | H | p-CN | n-C$_3$H$_7$ | |
| 458 | OCH$_3$ | H | p-CN | —CH$_2$CH$_2$COH$_3$ | |
| 459 | OCH$_3$ | H | p-CN | —CH$_2$CO—OCH$_3$ | |
| 460 | OCH$_3$ | H | p-CN | —CH$_2$CH$_2$CO—OCH$_3$ | |
| 461 | OCH$_3$ | H | p-Cl | —CH$_3$ | |
| 462 | OCH$_3$ | H | p-Cl | —C$_2$H$_5$ | |

TABLE 1-continued

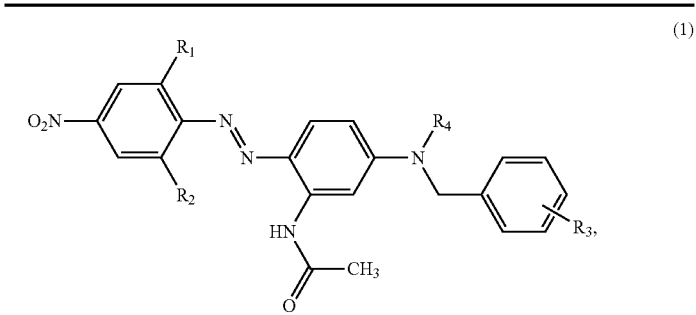

(1)

($\lambda_{max}$ = wavelength of the absorption maximum)

| Compound | $R_1$ | $R_2$ | $R_3$ | $R_4$ | $\lambda_{max}$/nm |
|---|---|---|---|---|---|
| 463 | OCH$_3$ | H | p-Cl | n-C$_3$H$_7$ | |
| 464 | OCH$_3$ | H | p-Cl | —CH$_2$CH$_2$OCH$_3$ | |
| 465 | OCH$_3$ | H | p-Cl | —CH$_2$CO—OCH$_3$ | |
| 466 | OCH$_3$ | H | p-Cl | —CH$_2$CH$_2$CO—OCH$_3$ | |
| 467 | OCH$_3$ | H | p-Br | —CH$_3$ | |
| 468 | OCH$_3$ | H | p-Br | —C$_2$H$_5$ | |
| 469 | OCH$_3$ | H | p-Br | n-C$_3$H$_7$ | |
| 470 | OCH$_3$ | H | p-Br | —CH$_2$CH$_2$OCH$_3$ | |
| 471 | OCH$_3$ | H | p-Br | —CH$_2$CO—OCH$_3$ | |
| 472 | OCH$_3$ | H | p-Br | —CH$_2$CH$_2$CO—OCH$_3$ | |
| 473 | OCH$_3$ | H | p-NO$_2$ | —CH$_3$ | |
| 474 | OCH$_3$ | H | p-NO$_2$ | —C$_2$H$_5$ | |
| 475 | OCH$_3$ | H | p-NO$_2$ | n-C$_3$H$_7$ | |
| 476 | OCH$_3$ | H | p-NO$_2$ | —CH$_2$CH$_2$OCH$_3$ | |
| 477 | OCH$_3$ | H | p-NO$_2$ | —CH$_2$CO—OCH$_3$ | |
| 478 | OCH$_3$ | H | p-NO$_2$ | —CH$_2$CH$_2$CO—OCH$_3$ | |
| 479 | OCH$_3$ | H | H | —CH$_3$ | |
| 480 | OCH$_3$ | H | H | —C$_2$H$_5$ | |
| 481 | OCH$_3$ | H | H | n-C$_3$H$_7$ | |
| 482 | OCH$_3$ | H | H | —CH$_2$CH$_2$OCH$_3$ | |
| 483 | OCH$_3$ | H | H | —CH$_2$CO—OCH$_3$ | |
| 484 | OCH$_3$ | H | H | —CH$_2$CH$_2$CO—OCH$_3$ | |
| 485 | CF$_3$ | H | m-NO$_2$ | —CH$_3$ | |
| 486 | CF$_3$ | H | m-NO$_2$ | —C$_2$H$_5$ | |
| 487 | CF$_3$ | H | m-NO$_2$ | n-C$_3$H$_7$ | |
| 488 | CF$_3$ | H | m-NO$_2$ | —CH$_2$CH$_2$COH$_3$ | |
| 489 | CF$_3$ | H | m-NO$_2$ | —CH$_2$CO—OCH$_3$ | |
| 490 | CF$_3$ | H | m-CF$_3$ | —CH$_2$CH$_2$CO—OCH$_3$ | |
| 491 | CF$_3$ | H | m-CF$_3$ | —CH$_3$ | |
| 492 | CF$_3$ | H | m-CF$_3$ | —C$_2$H$_5$ | |
| 493 | CF$_3$ | H | m-CF$_3$ | n-C$_3$H$_7$ | |
| 494 | CF$_3$ | H | m-CF$_3$ | —CH$_2$CH$_2$COH$_3$ | |
| 495 | CF$_3$ | H | m-CF$_3$ | —CH$_2$CO—OCH$_3$ | |
| 496 | CF$_3$ | H | m-CF$_3$ | —CH$_2$CH$_2$CO—OCH$_3$ | |
| 497 | CF$_3$ | H | p-OCH$_3$ | —CH$_3$ | |
| 498 | CF$_3$ | H | p-OCH$_3$ | —C$_2$H$_5$ | |
| 499 | CF$_3$ | H | p-OCH$_3$ | n-C$_3$H$_7$ | |
| 500 | CF$_3$ | H | p-OCH$_3$ | —CH$_2$CH$_2$OCH$_3$ | |
| 501 | CF$_3$ | H | p-OCH$_3$ | —CH$_2$CO—OCH$_3$ | |
| 502 | CF$_3$ | H | p-OCH$_3$ | —CH$_2$CH$_2$CO—OCH$_3$ | |
| 503 | CF$_3$ | H | p-CN | —CH$_3$ | |
| 504 | CF$_3$ | H | p-CN | —C$_2$H$_5$ | |
| 505 | CF$_3$ | H | p-CN | n-C$_3$H$_7$ | |
| 506 | CF$_3$ | H | p-CN | —CH$_2$CH$_2$OCH$_3$ | |
| 507 | CF$_3$ | H | p-CN | —CH$_2$CO—OCH$_3$ | |
| 508 | CF$_3$ | H | p-CN | —CH$_2$CH$_2$CO—OCH$_3$ | |
| 509 | CF$_3$ | H | p-Cl | —CH$_3$ | |
| 510 | CF$_3$ | H | p-Cl | —C$_2$H$_5$ | |
| 511 | CF$_3$ | H | p-Cl | n-C$_3$H$_7$ | |
| 512 | CF$_3$ | H | p-Cl | —CH$_2$CH$_2$OCH$_3$ | |
| 513 | CF$_3$ | H | p-Cl | —CH$_2$CO—OCH$_3$ | |
| 514 | CF$_3$ | H | p-Cl | —CH$_2$CH$_2$CO—OCH$_3$ | |
| 515 | CF$_3$ | H | p-Br | —CH$_3$ | |
| 516 | CF$_3$ | H | p-Br | —C$_2$H$_5$ | |
| 517 | CF$_3$ | H | p-Br | n-C$_3$H$_7$ | |
| 518 | CF$_3$ | H | p-Br | —CH$_2$CH$_2$OCH$_3$ | |
| 519 | CF$_3$ | H | p-Br | —CH$_2$CO—OCH$_3$ | |
| 520 | CF$_3$ | H | p-Br | —CH$_2$CH$_2$CO—OCH$_3$ | |
| 521 | CF$_3$ | H | p-NO$_2$ | —CH$_3$ | |
| 522 | CF$_3$ | H | p-NO$_2$ | —C$_2$H$_5$ | |
| 523 | CF$_3$ | H | p-NO$_2$ | n-C$_3$H$_7$ | |

TABLE 1-continued

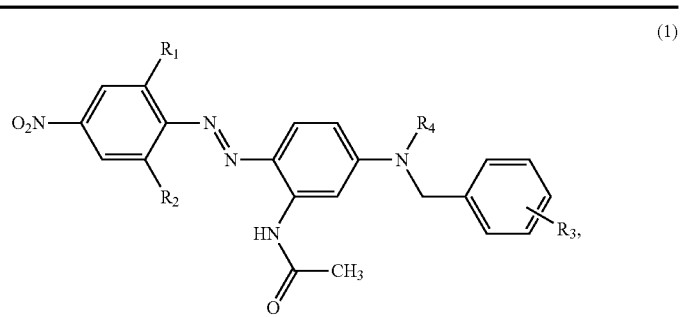

(1)

($\lambda_{max}$ = wavelength of the absorption maximum)

| Compound | $R_1$ | $R_2$ | $R_3$ | $R_4$ | $\lambda_{max}$/nm |
|---|---|---|---|---|---|
| 524 | CF$_3$ | H | p-NO$_2$ | —CH$_2$CH$_2$COH$_3$ | |
| 525 | CF$_3$ | H | p-NO$_2$ | —CH$_2$CO—OCH$_3$ | |
| 526 | CF$_3$ | H | p-NO$_2$ | —CH$_2$CH$_2$CO—OCH$_3$ | |
| 527 | CF$_3$ | H | H | —CH$_3$ | |
| 528 | CF$_3$ | H | H | —C$_2$H$_5$ | 532 |
| 529 | CF$_3$ | H | H | n-C$_3$H$_7$ | |
| 530 | CF$_3$ | H | H | —CH$_2$CH$_2$COH$_3$ | |
| 531 | CF$_3$ | H | H | —CH$_2$CO—OCH$_3$ | |
| 532 | CF$_3$ | H | H | —CH$_2$CH$_2$CO—OCH$_3$ | |
| 533 | Br | H | m-CF$_3$ | —C$_2$H$_5$ | |
| 534 | Br | H | m-CF$_3$ | n-C$_3$H$_7$ | |
| 535 | Br | H | m-CF$_3$ | —CH$_2$CH$_2$COH$_3$ | |
| 536 | Br | H | m-CF$_3$ | —CH$_2$CO—OCH$_3$ | |
| 537 | Br | H | m-CF$_3$ | —CH$_2$CH$_2$CO—OCH$_3$ | |
| 538 | Br | H | p-OCH$_3$ | —CH$_3$ | |
| 539 | Br | H | p-OCH$_3$ | —C$_2$H$_5$ | |
| 540 | Br | H | p-OCH$_3$ | n-C$_3$H$_7$ | |
| 541 | Br | H | p-OCH$_3$ | —CH$_2$CH$_2$OCH$_3$ | |
| 542 | Br | H | p-OCH$_3$ | —CH$_2$CO—OCH$_3$ | |
| 543 | Br | H | p-OCH$_3$ | —CH$_2$CH$_2$CO—OCH$_3$ | |
| 544 | Br | H | p-CN | —CH$_3$ | |
| 545 | Br | H | p-CN | —C$_2$H$_5$ | |
| 546 | Br | H | p-CN | n-C$_3$H$_7$ | |
| 547 | Br | H | p-CN | —CH$_2$CH$_2$OCH$_3$ | |
| 548 | Br | H | p-CN | —CH$_2$CO—OCH$_3$ | |
| 549 | Br | H | p-CN | —CH$_2$CH$_2$CO—OCH$_3$ | |
| 550 | Br | H | p-Cl | —CH$_3$ | |
| 551 | Br | H | p-Cl | —C$_2$H$_5$ | |
| 552 | Br | H | p-Cl | n-C$_3$H$_7$ | |
| 553 | Br | H | p-Cl | —CH$_2$CH$_2$OCH$_3$ | |
| 554 | Br | H | p-Cl | —CH$_2$CO—OCH$_3$ | |
| 555 | Br | H | p-Cl | —CH$_2$CH$_2$CO—OCH$_3$ | |
| 556 | Br | H | p-Br | —CH$_3$ | |
| 557 | Br | H | p-Br | —C$_2$H$_5$ | |
| 558 | Br | H | p-Br | n-C$_3$H$_7$ | |
| 559 | Br | H | p-Br | —CH$_2$CH$_2$OCH$_3$ | |
| 560 | Br | H | p-Br | —CH$_2$CO—OCH$_3$ | |
| 561 | Br | H | p-Br | —CH$_2$CH$_2$CO—OCH$_3$ | |
| 562 | Br | H | p-NO$_2$ | —CH$_3$ | |
| 563 | Br | H | p-NO$_2$ | —C$_2$H$_5$ | |
| 564 | Br | H | p-NO$_2$ | n-C$_3$H$_7$ | |
| 565 | Br | H | p-NO$_2$ | —CH$_2$CH$_2$OCH$_3$ | |
| 566 | Br | H | p-NO$_2$ | —CH$_2$CO—OCH$_3$ | |
| 567 | Br | H | p-NO$_2$ | —CH$_2$CH$_2$CO—OCH$_3$ | |
| 568 | Br | H | H | —CH$_3$ | |
| 569 | Br | H | H | —C$_2$H$_5$ | |
| 570 | Br | H | H | n-C$_3$H$_7$ | |
| 571 | Br | H | H | —CH$_2$CH$_2$OCH$_3$ | |
| 572 | Br | H | H | —CH$_2$CO—OCH$_3$ | |
| 573 | Br | H | H | —CH$_2$CH$_2$CO—OCH$_3$ | |
| 574 | Br | H | m-NO$_2$ | —CH$_3$ | |
| 575 | Br | H | m-NO$_2$ | —C$_2$H$_5$ | |
| 576 | Br | H | m-NO$_2$ | n-C$_3$H$_7$ | |
| 577 | Br | H | m-NO$_2$ | —CH$_2$CH$_2$OCH$_3$ | |
| 578 | Br | H | m-NO$_2$ | —CH$_2$CO—OCH$_3$ | |
| 579 | Br | H | m-CF$_3$ | —CH$_2$CH$_2$CO—OCH$_3$ | |
| 580 | Br | H | m-CF$_3$ | —CH$_3$ | |

II. APPLICATION EXAMPLES

II.1: Dyeing of Polyester 1 part by weight of the dye of formula (101) prepared in Example 1.1 is milled together with four parts of a commercially available dispersing agent and 15 parts of water. Using that formulation, a 1% dyeing (based on the dye and the substrate) is produced on woven polyester by high temperature exhaust process at 135° C.

Test results: the light fastness of the dyeing is excellent as well as the results in the AATCC 61 and ISO 105 tests. The build up properties of the dye are very good.

What is claimed is:

1. A dye of formula

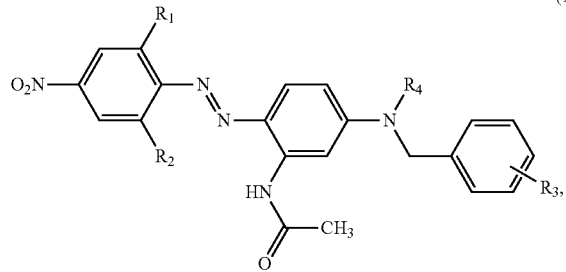

(1)

wherein $R_1$ is methyl, methoxy or trifluoromethyl;
$R_2$ is hydrogen, chloro, or trifluoromethyl;
$R_3$ is hydrogen, chloro, bromo, methoxy, trifluoromethyl, nitro or cyano; and
$R_4$ is 2-methoxyethyl, methoxycarbonylmethyl or 2-methoxycarbonylethyl.

2. The dye of formula (1) according to claim 1, wherein $R_1$ is methyl.

3. The dye of formula (1) according to claim 1, wherein $R_2$ is chloro.

4. The dye of formula (1) according to claim 1, wherein $R_3$ is hydrogen.

5. A process for the preparation of the dye of formula (1) according to claim 1, which comprises diazotising a compound of formula

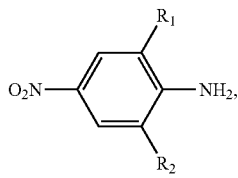

(2)

and coupling the diazonium compound so obtained to a coupling component of formula

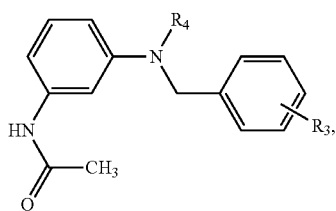

(3)

wherein $R_1$, $R_2$, $R_3$ and $R_4$ have the meanings given for formula (1) in claim 1.

6. A dye mixture comprising at least one dye of formula (1) according to claim 1 and at least one further dye selected from the group consisting of C.I. Disperse Blue 60, C.I. Disperse Blue 79:1, C.I. Disperse Blue 72:2, C.I. Disperse Blue 148, C.I. Disperse Blue 149, C.I. Disperse Blue 165, C.I. Disperse Blue 165:1, C.I. Disperse Blue 207, C.I. Disperse Blue 284, C.I. Disperse Blue 295, C.I. Disperse Blue 316, C.I. Disperse Blue 337, C.I. Disperse Blue 354, C.I. Disperse Blue 366, C.I. Disperse Blue 367, C.I. Disperse Blue 368, C.I. Disperse Blue 376, C.I. Disperse Blue 378, C.I. Disperse Blue 380, C.I. Disperse Green 9, C.I. Disperse Violet 107, a compound of the formula

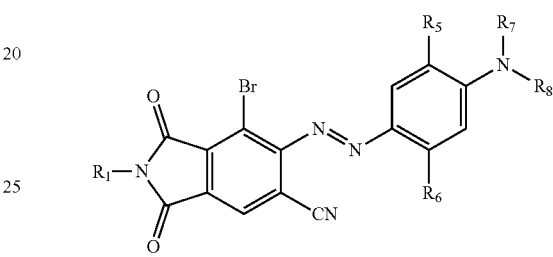

wherein $R_1$ is ethyl, $R_5$ is hydrogen, $R_6$ is acetylamino, $R_7$ is ethyl, 2-methoxyethyl, n-propyl, n-butyl, 2-cyanoethyl, 1-methoxycarbonylethyl, 1-methoxycarbonylmethyl, allyl, 2-methoxycarbonylethyl, hydrogen, 2-cyanoethyl, benzyl or n-butyl and wherein when $R_7$ is ethyl, $R_8$ is methyl, ethyl, n-propyl, n-butyl, benzyl, 2-methoxyethyl, 2-cyanoethyl, 2-phenylethyl, ethoxycarbonylmethyl, 2-methoxycarbonylethyl, 2-acetoxyethyl, 2-hydroxy-3-phenoxypropyl, 2-ethoxycarbonylethyl, 2-hydroxy-3-isopropoxypropyl, 1-methoxycarbonylethyl, 1-ethoxycarbonylethyl, 4-nitrobenzyl,4-methoxybenzyl, 3-methoxybenzyl, 3-phenoxypropyl or 4-acetoxybutyl and wherein when $R_7$ is 2-methoxyethyl, $R_8$ is 2-methoxyethyl or benzyl and wherein when $R_7$ is n-propyl, $R_8$ is n-propyl and wherein when $R_7$ is n-butyl, $R_8$ is n-butyl and wherein when $R_7$ is 2-cyanoethyl, $R_8$ is benzyl or 2-methoxycarbonylethyl and wherein when $R_7$ is 1-methoxycarbonylethyl, $R_8$ is 1-methoxycarbonylmethyl and wherein when $R_7$ is methoxycarbonylmethyl, $R_8$ is methoxycarbonylmethyl and wherein when $R_7$ is allyl, $R_8$ is allyl and wherein when $R_7$ is 2-methoxycarbonylethyl, $R_8$ is 2-ethoxycarbonylethyl or 2-methoxycarbonylethyl and wherein when $R_7$ is hydrogen, $R_8$ is 1-methoxycarbonylethyl and wherein when $R_7$ is 2-cyanoethyl, $R_8$ is 2-methoxycarbonylethyl and wherein when $R_7$ is benzyl, $R_8$ is 2-methoxycarbonylethyl and wherein when $R_7$ is n-butyl, $R_8$ is n-butyl or benzyl, the compounds of formulas (101)-(106) and the compounds of formulas II-2, II-3, II-4
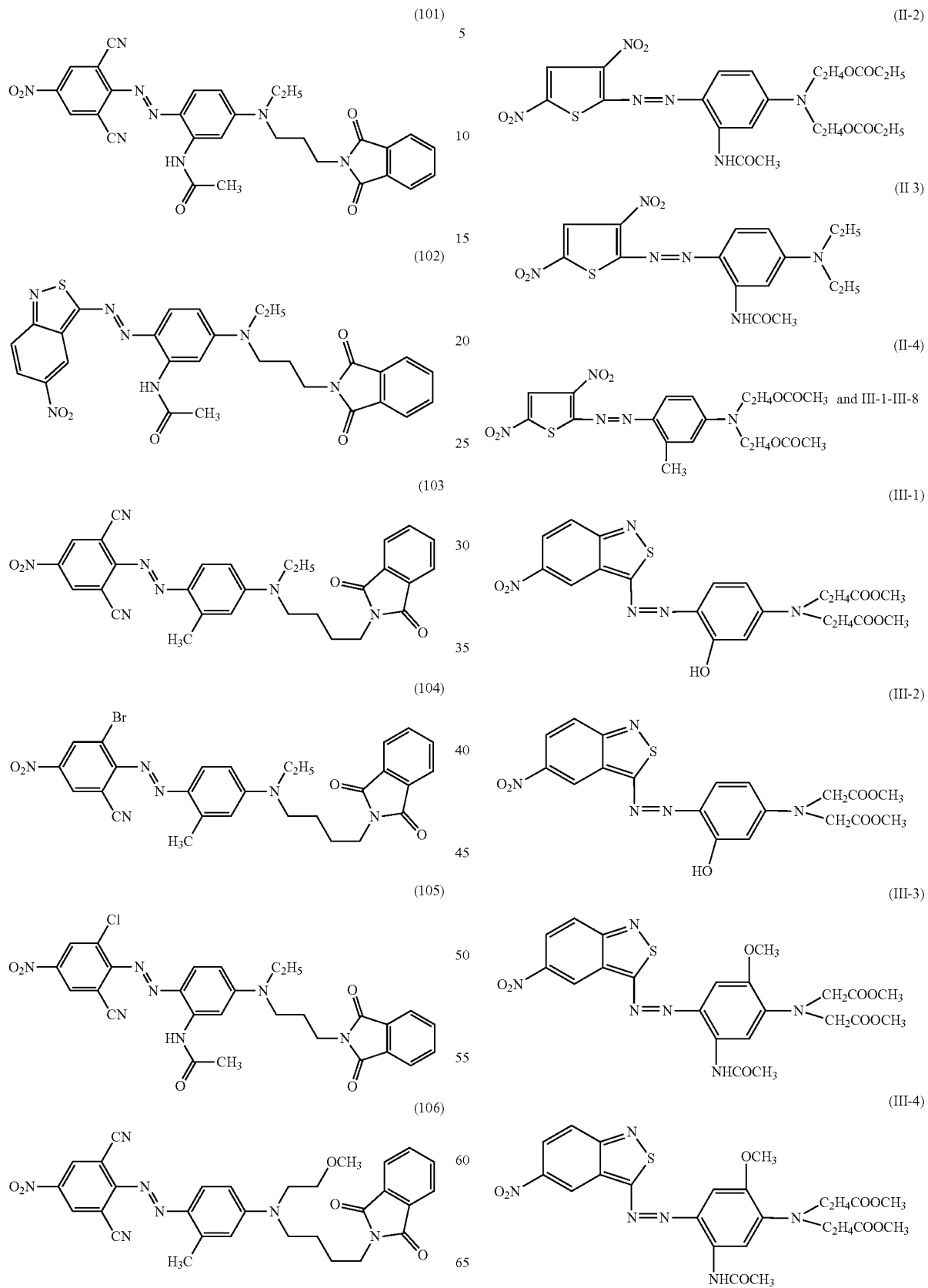

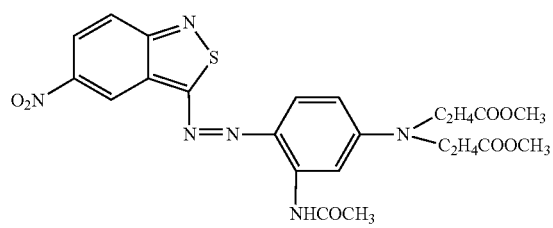

(III-5)

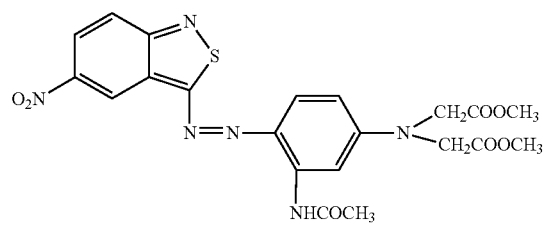

(III-6)

(III-7)

(III-8)

7. A process for dyeing or printing semi-synthetic or synthetic hydrophobic fibre material which comprises applying to or incorporating into the hydrophobic fibre material at least one dye of formula (1) according to claim 1 or the dye mixture according to claim 6.

8. A process according to claim 7, wherein the hydrophobic fibre material contains polyester fibres.

9. A material dyed or printed according to claim 7.

* * * * *